United States Patent [19]

Miyada

[11] 3,956,888
[45] May 18, 1976

[54] COAXIAL ROTARY ENGINE
[76] Inventor: Thomas Sanfran Miyada, P.O. Box 430, Summit, N.J. 07901
[22] Filed: Jan. 7, 1975
[21] Appl. No.: 539,052

[52] U.S. Cl. .............................. 60/39.08; 60/39.34
[51] Int. Cl.² ......................... F02C 7/06; F02C 5/02
[58] Field of Search ............ 60/39.34, 39.35, 39.08; 123/8.27, 8.31

[56] References Cited
UNITED STATES PATENTS
3,541,787  11/1970  Romoli ............................. 60/39.35
3,811,275  5/1974   Mastrobuono .................... 60/39.34

Primary Examiner—Carlton R. Croyle
Assistant Examiner—L. J. Casaregola

[57] ABSTRACT

This invention relates to a coaxial rotary engine. It has a stationary central cylindrical wall that supports and holds compressing and exhaust gates that open and close at the right time without direct human or electronic help, coaxial rotors with long, arcuate pistons that contain compressing chambers equipped with automatic inlet and outlet ports, compact combustors that do not require turbines, an automatic ignition system that fires at the proper moment, air passageway that runs through its center for internal cooling. It has no internal gears, nor off-centered rotors, nor reciprocating pistons, nor crankshaft. It burns gasoline amid ample air and at a comparatively low temperature, and consequently its exhausts contain extremely small amount of CO, $NO_x$, and other pollutants. It could also burn hydrogen, hydrogen peroxide 80+, and other fuels. It may be built small enough to run a lawn mower, motorcycle, small fishing boat, or home generator, or large enough to power an airplane, a helicopter, or a rural power plant.

8 Claims, 28 Drawing Figures

COAXIAL ROTARY ENGINE

SUMMARY AND BACKGROUND OF THE INVENTION

My simplified rotary engine has comparatively small number of moving and stationary parts. It is made in a compact configuration, which comprises a pair of rotors, which contain pistons and primary compressing chambers in their peripheral sections; a stationary central cylindrical wall that supports and holds leak-proof gates which open and close at proper times without direct human or electronic help, and against which the pistons compress gases; high pressure compressing chambers with automatic inlet and outlet ports; and compact combustors provided with automatic ignition devices.

Each of its pistons is constructed in a long arcuate shape that may be metaphorically compared to a snake's anatomy. An opening that may be compared to a snake's mouth is made in the foward wall of each piston. A passageway that may be likened to a throat connects the said mouthlike opening to a stomach-like compressing chamber located inside the piston. An automatic outlet port of the said stomach-like chamber opens at regular intervals to release compressed gases into a combustor located further inside each piston.

After being compressed by the action of each piston against a closed gate and a closed outlet, the gases pass from the compressing chambers, via an automatic outlet, into each combustor, where they are ignited. The resulting expanding gases rushing out of the combustor's terminal opening strike a closed gate, and the rotor, which holds the piston which in turn contains the combustor, spins by reaction. Thus the kinetic energy of the expanding gases is converted into a usable rotary motion.

DETAILED DESCRIPTION

For a fuller description of the parts, assembly, and operation of the said engine, references are made to the following specification and to the accompanying drawings wherein like reference numbers are utilized to refer to identical components throughout the several drawings. It is understood that this invention is not to be construed as limited to the particular forms illustrated or described herein, since the forms were choosen for the purpose of disclosure, and, therefore, should be regarded as illustrative rather than restrictive.

Referring now to the said drawings.

DEFINITIONS OF CERTAIN WORDS AND TERMS USED HEREIN

LEFT and RIGHT, and similar relative terms and words used herein are intended to take the places similar to those of algebraic literal symbols and to make certain descriptions less confusing, and are not intended to be permanent designations of the mechanical parts. The accompanying drawings are used as the frame of reference.

Up and Down in a circular body: Except when the contex clearly indicates the contrary, the peripheral side is UP, and the side toward the center is DOWN whenever any movement or position in a circular body is to be determined or described.

HOLE, HOLLOW, OPENING, GROOVE, or similar noun is used herein to mean the infinitesimally narrow physical part or elements that encircle or define a usable space as well as the space itself, and is not intended to mean an unpatentable, unless void, or non-existence.

Figure 21:
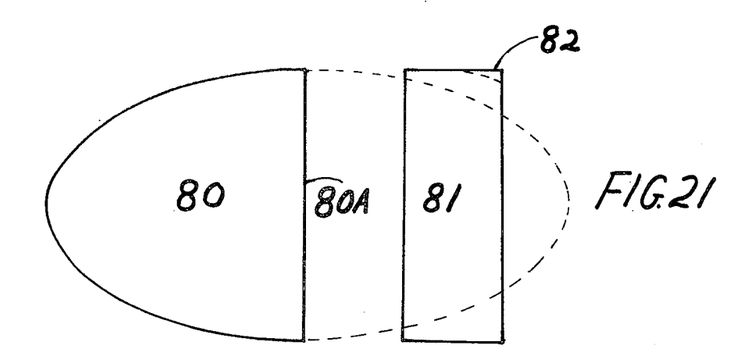
FIG. 21 shows the geometric components of the para-ellipse, while FIG. 22 gives an elevation view of the gate.

Para-ellipse or para-elliptic as used only in this application: the shape somewhat resembling the graph of $y = \sec x$ (as shown in FIG. 21) is defined for the purpose of this application as a shape obtained by dividing an ellipse into halves by cutting along its minor axis, and, in the place of the discarded half, a long side of a rectangle (81) of the same length as the said minor axis is attached to the side (80a), which corresponds to the said minor axis, in such a way that the said semi-ellipse (80) and the said rectangle (81) become a single shape without a border between them, but with one of the sharp corners (82) slightly rounded or curved. To avoid the frequent repetitions of the rather involved description, the said shape shall be referred to simply as para-ellipse or para-elliptic.

THE CASING OF THE ENGINE

The engine's casing is cuboidal with comparatively thick square front and rear walls (FIG. 1), and detachable rectangular sidewalls (FIG. 2) with the sharp corners rounded. Each of the square walls has in its center a round opening (1) with bearings for the support of the central power output shaft (16), and a plurality of round inlets for air (2) and several dozens of threaded holes (3) encircling, but not touching, the said central opening. The rectangular sidewalls (FIG. 2) are provided with many ventilating holes bored at random. The airy cage-like casing provides the main support for the engine.

THE STATIONARY CENTRAL CYLINDRICAL WALL

Figure 1:
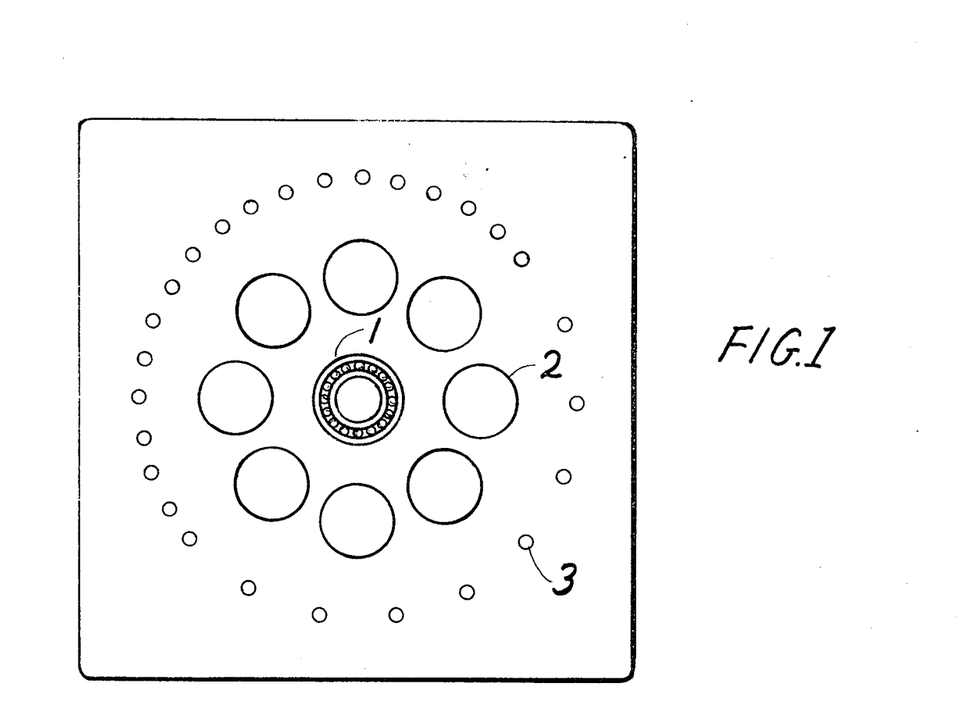
FIG. 1 shows the shape of the front and the rear walls of the engine's casing.
Figure 2:
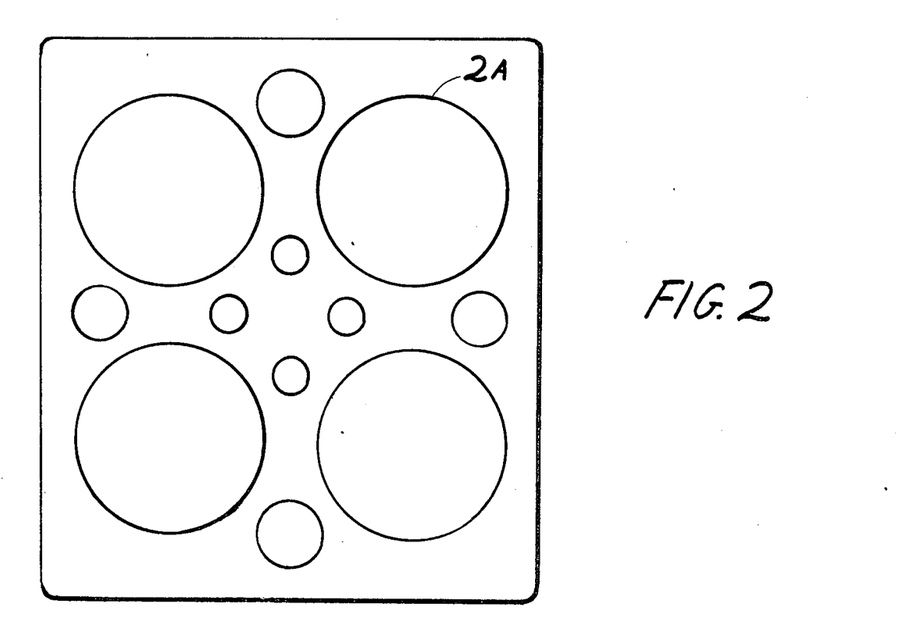
FIG. 2 shows one of the four identical sidewalls of the casing.

The stationary central cylindrical wall is a substantially circular body (FIGS. 3 and 5) that has a thickness, measured axially, of about one-eighth of its diameter, and that occupies, when assembled, the mid-section of the casing's interior. Its radial sides are positioned parallel to the surfaces of the casing's square walls (FIG. 1). By its position in the casing, it separates the principal moving parts of the engine into the right and the left rotating members. It is securely attached by means of bolts to the rectangular walls (FIG. 2) of the casing that are tangent to it.

The said cylindrical wall's peripheral side is divided into degrees, and the degree markings are clearly etched thereon. Starting from a point that is normally the top or 0° when the engine is on a horizontal plane, the degrees are measured in the direction of the engine's rotation, which is clockwise in the drawings accompanying this application. (To avoid overcrowding in the drawing (FIG. 3), the degree markings are shown in the schematic illustration (FIG. 7).)

The central section (18) of the cylindrical wall has a plurality of elliptic holes (4) for the passage of air, and a central circular opening (16a) with roller bearings for the support of the central power output shaft.

In each of the radial sides of the said cylindrical wall is a pair of grooves: the outer groove (17) following a circular path close to, but not touching, the wall's peripheral edge, and making a complete circle, and the inner groove following a circular path, corresponding approximately to a line that is half-way between the periphery and the center of the said wall, and also making a complete circle. The space between this second groove (19) and the first groove (17) is constant, and is substantially equal to the distance between the outer and the inner rims of the rotors (to be described).

The said cylindrical wall (FIGS. 3 and 5) has in its peripheral section a pair of para-elliptic openings (10 and 10a) for gates of the same shape (to be described) to swing in and out of them. In the preferred embodiment, the two openings are located about 90° apart as determined by the markings on the said wall. The said openings are made between the inner (19) and the outer (17) grooves, but not touching them.

Figure 6:
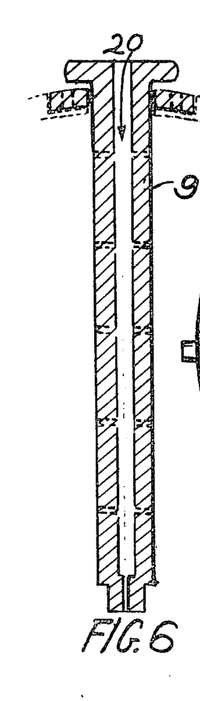
FIG. 6 is a cross section of the shaft on which each gate pivots.

Near the straight side (8), but inside, of each para-elliptic opening, and extending parallel to the radial side of the wall as well as to the said straight side is a shaft (9) that is second only to the central power output shaft in respect to size and strength, and whose ends are held rotatably in the casing and the said wall. FIG. 6 shows this shaft in cross section. It has a channel for oil (20) running down its center, and outlets (20a).

Figure 3:
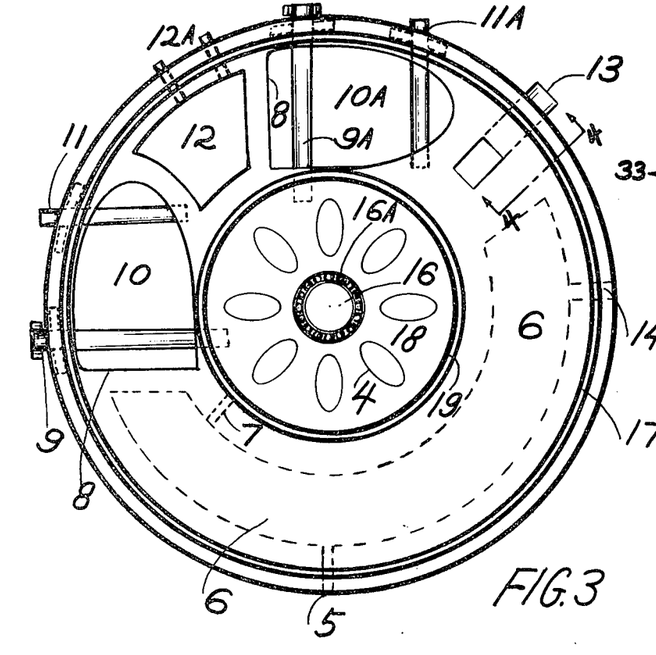
FIG. 3 is a front elevation view of the central cylindrical wall.
Figures 4, 5:
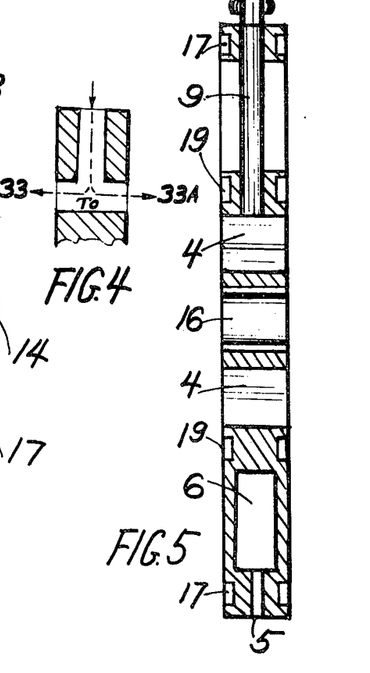
FIG. 4 is a cross section of the fuel and air intake port and passageway.
FIG. 5 shows the cross section of the said cylindrical wall.
Figure 8:
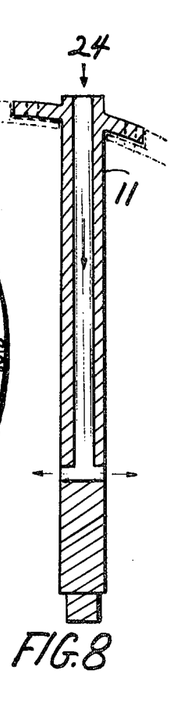
FIG. 8 is that of the column used to stop the gate from turning too far.

The fuel and air intake port is located between 0° and 90° of the cylindrical wall and is identified as 13 in FIG. 3. Its cross-section is shown in FIG. 4. The exhausts enter the space marked 12 and exit through openings (12a and 12b). On the opposite side of each shaft (9), where the curvature of the said para-elliptic opening is the greatest, but inside said opening and parallel to the shaft, is a column (11) whose ends are held in the casing and the said wall, and which has a passageway for gases running down its center (24) as shown in FIG. 8.

The interior of the said cylindrical wall, not occupied by the aforesaid openings, shafts, columns, and ports, contain an oil reservoir (6) with inlets and outlets, and plurality of small ducts that lead into, and continually lubricate, the aforesaid grooves, central bearings, and other parts.

THE FUNCTIONS OF THE CYLINDRICAL WALL

The said cylindrical wall provides (a) the main support for the shafts on which the gates (to be described) could swing, and the openings in which the gates can make their 90° turns, (b) grooves in which the rims of the open side of each rotor could fit into, (c) central support for the power output shaft, (d) oil reservoir for the use of adjacent parts. It also separates the two rotors into the left and the right rotating members, and keeps their paths parallel to each other.

THE GATES

The preferred embodiment has two gates for each pair of rotors, but a larger embodiment may use more. The word "gate" as used herein means a generally leak-proof body that periodically swings into the engine's compressing chambers and functions somewhat like a door, against which an advancing piston could push or compress gases that may be found in its path.

Figure 20:
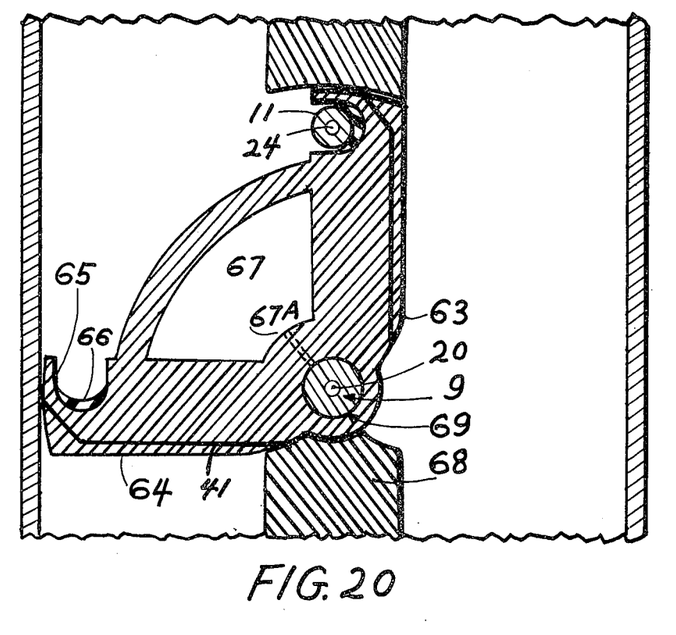
FIG. 20 is a cross section of the gate, and may be considered as a plan view if the hatchings are removed.

The unusual shape and general structure of the said gate can be best described by translating the drafting technique into words. Its general appearance as seen from the top or peripheral side with the obstructing walls removed is a quadrant having a circular hole for a shaft bored near its right angled corner with the sharp angle rounded, a fan-shaped space for an oil reservoir in the middle bounded by its two side walls and an arched wall, the latter located slightly closer to the gate's periphery than to the hole of the shaft, and linking the said two side walls. The space between the walls corresponding the two sides of a quadrant, and above the said arched wall is empty. In the inner sides of the said two walls and above the arched wall of the said reservoir, and facing each other are concave niches or recesses.

The above is shown in FIG. 20, wherein 69 is the hole for the shaft (9), 67 is the oil reservoir, 63 and 64 are the walls referred to as the two sides of a quadrant, 65 and 65a show the concaved recesses, 41 represents the seal, 67a the oil ducts connecting the reservoir and the said shaft, and 68 is a section of the central cylindrical wall and the said shaft, and 68 is a section of the central cylindrical wall that cooperates with the column 11 to prevent the gate to swing too far to either side. Elastic cushions (66 and 66') are placed at 65 and 65'.

Figure 22:
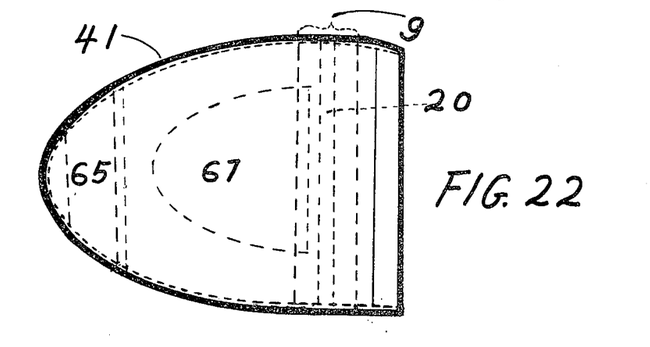

Its front view as seen from the direction of the compressing chamber and the approaching piston is that of a body that has a semi-elliptic shape up to a point corresponding to the minor axis of an ellipse shape up to a point corresponding to the minor axis, and thereafter having parallel upper and lower sides that are perpendicular to the said minor axis, and terminating near the said round hole of the shaft. FIG. 22 shows this front view, wherein 41 is the seal.

The overall shape of each gate is similar to the surface of revolution generated by rotating the already defined para-ellipse 90° about its short straight side as the axis.

The curvatures of the contacting sides and surfaces of each gate are made to match those of the inner surfaces and sides of the primary compressing chambers. One of the right angled corners of each gate is slightly curved or rounded (82), shown in FIG. 21.

Each gate is designed to pivot on its shaft located in one of the para-elliptic openings of the stationary central cylindrical wall (FIG. 3). Of the two gates required by the preferred embodiment, the first (21), shown in the schematic drawing (FIG. 7), is pivoted on shaft (9) located in the said para-elliptic opening (10). The said shaft is held in the said cylindrical wall at a point corresponding to the 265th degree as marked on the said wall. This is the gate against which the pistons compress the gases, and it is also the gate that must face the full blast of the exhausts immediately after the exhaust end of each combustor has passed it. The gate is made of strong alloy, and its shaft is second only to the central power output shaft in respect to strength. The shaft, shown in cross section in FIG. 6, has an oil duct running down its center, and many outlets (20 and 20a).

Columns 11 and 11a, located in the said para-elliptic openings of the cylindrical wall (FIG. 3) fit into the concave recesses or niches (65 and 65a) of each gate (FIG. 20), and prevent the latter from turning too far in either direction.

The column (11 as well as 11a) serving each gate has a passageway (24), shown in FIG. 8, running down its center, but the passageway is not used when the engine is burning gasoline.

The second gate (22) has its shaft in the said cylindrical wall at a point about 90 degrees beyond the first gate or at 355 th degrees as determined by the markings on said wall. Unlike the first, the second gate needs not be built very strong for it does not have to face the full blast of the exhausts coming out of the combustors.

Combustion is automatically timed so that the hot expanding gases rush out of each passing combustor only when the combustor's tail or exhaust end is still inside the 90° exhaust zone between the first and the second gates. Immediately after the first gate gets the full blast of the exhausts, the second gate helps to prevent the exhausts from contaminating the compressing chambers located beyond it.

A large opening (12), shown in FIG. 3, is located between openings (10) and (10a). Since the radial side of the central cylindrical wall serves as the contacting wall of the primary compressing chamber (33), the exhausts in the exhaust zone (23) in each primary compressing chamber will readily enter the opening (12) in the said cylindrical wall to be expelled through exits (12a) and (12b).

The contacting sections of the two gates are provided with conventional seals (41). Due to their smooth semi-elliptic curvature, seals perform very well on them. The straight sides of the gate do not pose a problem in this regard.

The niches (65), shown in FIG. 20, are cushioned with elastics (66).

The position of the first gate (21) and the distance between the first and the second gates could be varied in manufacture, and in one of the embodiments of this engine, the space between the two gates are made greater than 120° as measured on the central cylindrical wall markings.

Other shapes of the first and the second gates may be used for other embodiments of this invention. In the preferred embodiment, gates somewhat resembling a quarter of a flattened oblate ellipsoid are used since they cost less to make, and do not create problems that are associated with certain other shaped bodies that cannot turn smoothly in a curved internal space of a rotating body.

THE ROTORS

The preferred embodiment has a pair of rotors which have the general outer appearance of two halves obtained from a traditional doughnut that was sliced into two symmetrical parts along its equator, and the "hole" refilled. For large engines, more than one pair may be used.

The engine's rotor is mostly a hollow shell with thick wall. Its shape can be reproduced accurately: first, by creating a surface by rotating in space an ellipse about an axis in its plane without intersecting the ellipse and with the major axis of the ellipse parallel to the axis in its plane; second, by translating the surface thus generated into thick wall; and, finally, slicing the thick walled object completely around its equator into two symmetrical parts, each part having its 360° of peripheral rim and 360° of inner rim that defines a hollow resembling that of a traditional doughnut.

Figure 13:
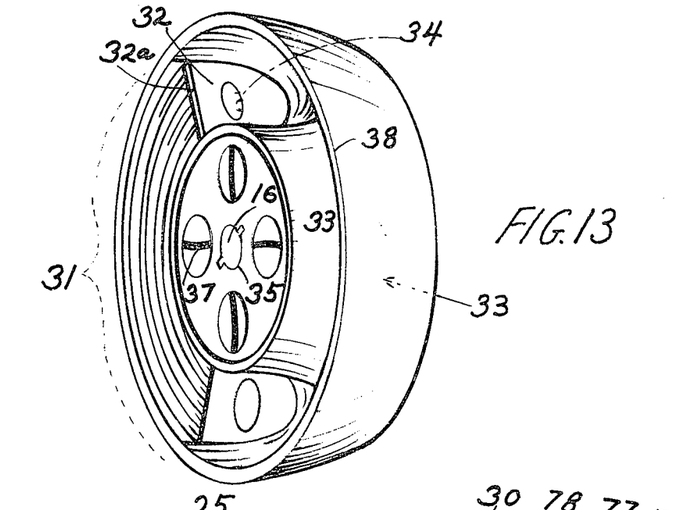

As shown in FIG. 13, 220° of the wide sidewall of the primary compressing chamber (33) of each rotor is missing. This is because it is the side of the primary compressing chamber section of the rotor that must face the said stationary cylindrical wall, and the gates held in the said wall must swing in and out of this section of the rotor.

In order to make each assembled rotor leak-proof in respect to fluids, the rims (38 and 39 in FIGS. 15 and 19) of each rotor are extended so that they will fit into the circular grooves (17 and 19 that are located in each of the radial sides of the cylindrical wall (FIG. 3). The radial sides of the said cylindrical wall effectively serve as the missing walls of the primary compressing chambers located in the rotors.

Figure 9:
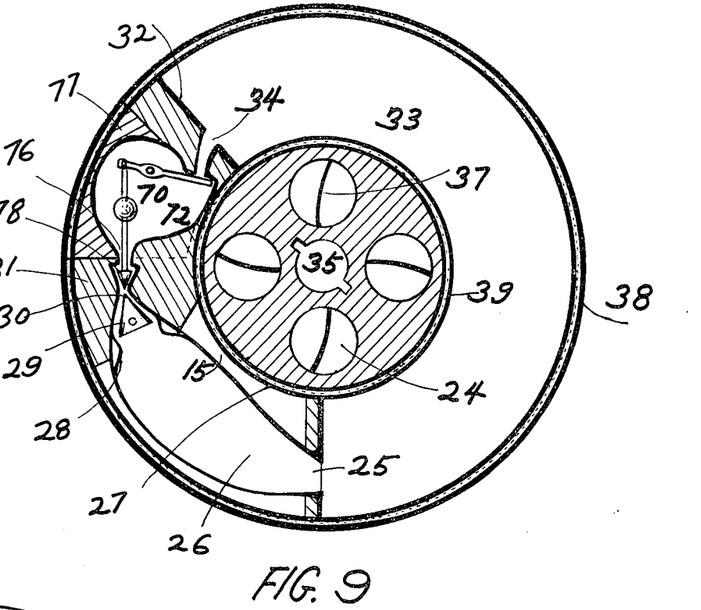
FIG. 9 is a cross section of the rotor showing the locations of the primary compressing chamber, and the piston section that contains the high pressure compressing chamber and the combustor.
Figures 15, 16, 17, 18, 19:
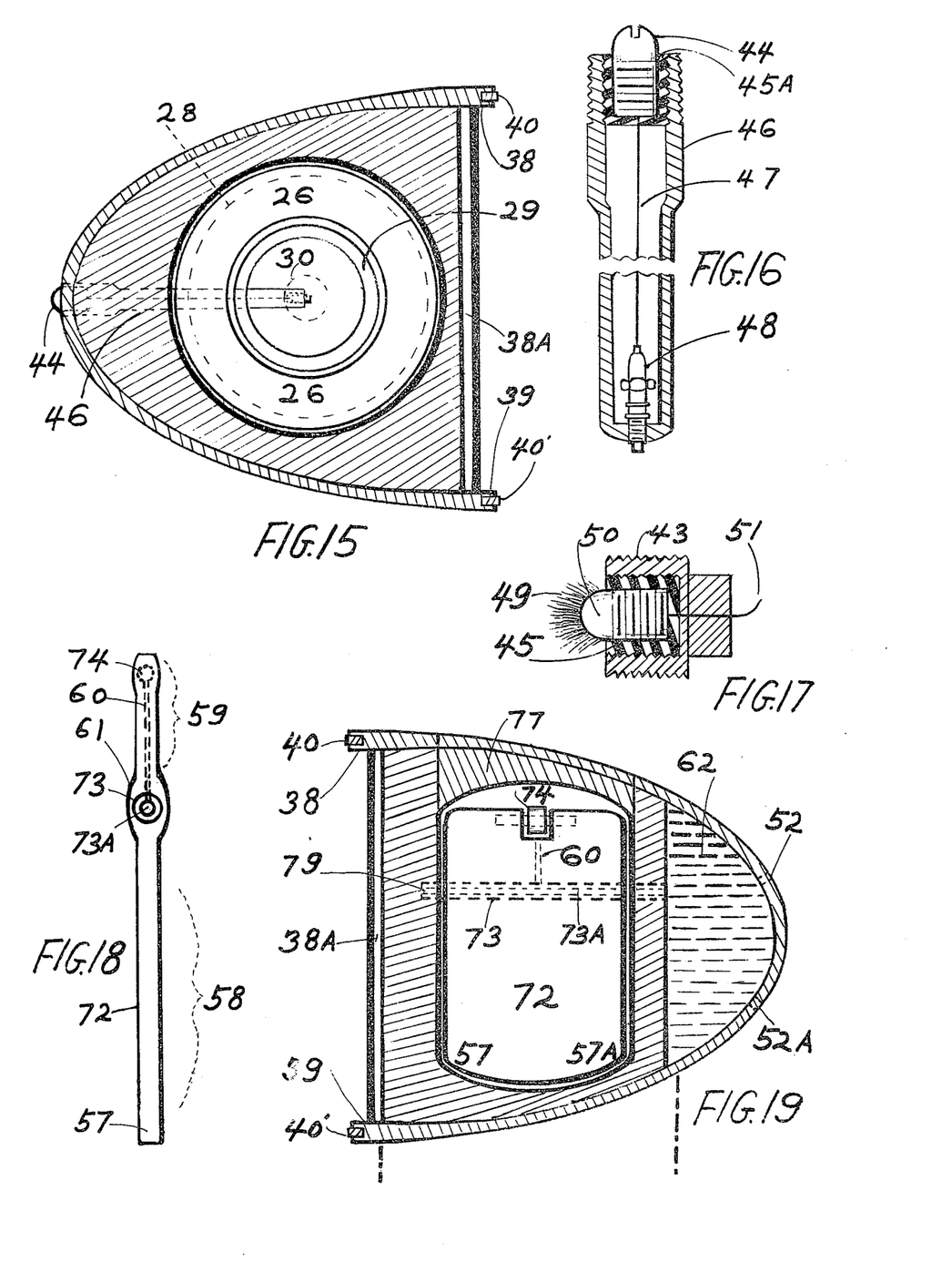
FIG. 15 is a cross section of the combustor.
FIGS. 16 and 17 are the conductors of the ignition system.
FIG. 18 shows a side view of the inlet plate.
FIG. 19 shows a cross sectional view of the high pressure compressing chamber.

The rims are comparatively thick and have seals (40), shown in FIGS. 15 and 19. To avoid overcrowding of the drawings, seals are not shown in FIGS. 9 and 13.

The hollow semi-elliptic interior of each rotor is divided into a primary compressing chamber (33) that subtends about 220° of the rotor's arc, and a long, arcuate, mostly hollow piston (31) that occupies the rest of the space.

The forward wall (the side that must face in the direction of the rotor's rotation, or clockwise in the drawings) or each piston is made comparatively thick so that it could serve as a piston head (32). The interior of each piston (31), which is comparatively long and roomy, contains (a) a high pressure compressing chamber (70) with its automatic inlet (71) and outlet (76), (b) a combustor (26) and an automatic ignition means, and (c) an oil reservoir (62) with its inlet (52) an outlet (52a), shown in FIG. 19. The piston head has a seal (32a).

Figure 10:
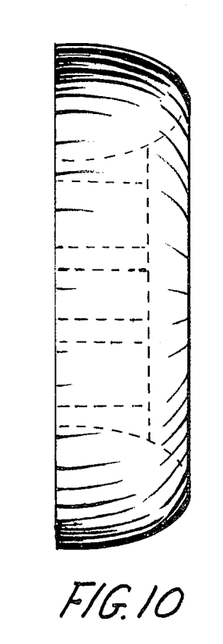
FIG. 10 represents the side view of the rotor.
Figures 11, 12:
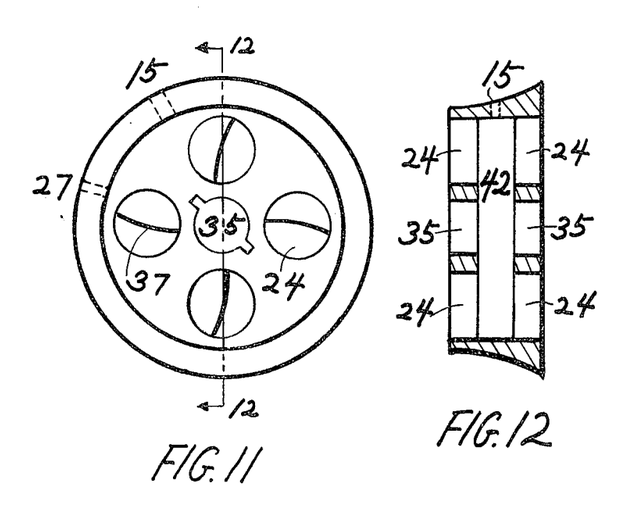
FIGS. 11 and 12 show the elevation and cross section, respectively, of the central section of each rotor. The perspective view of each rotor is shown in FIG. 13.

The central hollow of each rotor, corresponding to the round hole of a doughnut, it not left intact. It is filled with a circular body (FIGS. 11 and 12) that has a hub (35) that supports and holds the central power output shaft. It has no spokes, but has a plurality of round holes (24) in their places. A curved blade (37) is welded across, but inside, each of the said round holes. The blades themselves do not have independent movement, but as fixed parts of the rotor's central section must rotate with each rotor. As a result, the said blades draw in cooling air into the center of the engine. The said circular body, the central section of each rotor, is shown in FIG. 11. It has an air space (42) in its interior with outlets 27 and 15 (FIGS. 12 and 11) FIG. 10 is a side view of a rotor. FIG. 15 shows an oil container 38a.

The peripheral section or the rotor proper and its central section are welded together as a single unit. Since the rotors are designed to turn in unison with the power output shaft, and is necessary to prevent slipping and sliding, the hub of each rotor is secured to the power shaft with a combination of keys and bolts.

In the forward wall of each piston is an opening (34), which has been compared to a "mouth" in the summary. Through this opening, the primary compressing chamber communicates with the piston's interior. The said opening in the beginning of a short passageway (36), descirbed eariler as the throat, that leads into the high pressure compressing chamber (70), which has been compared to a stomach, and which will be described next.

THE HIGH PRESSURE COMPRESSING CHAMBER

Figure 14:
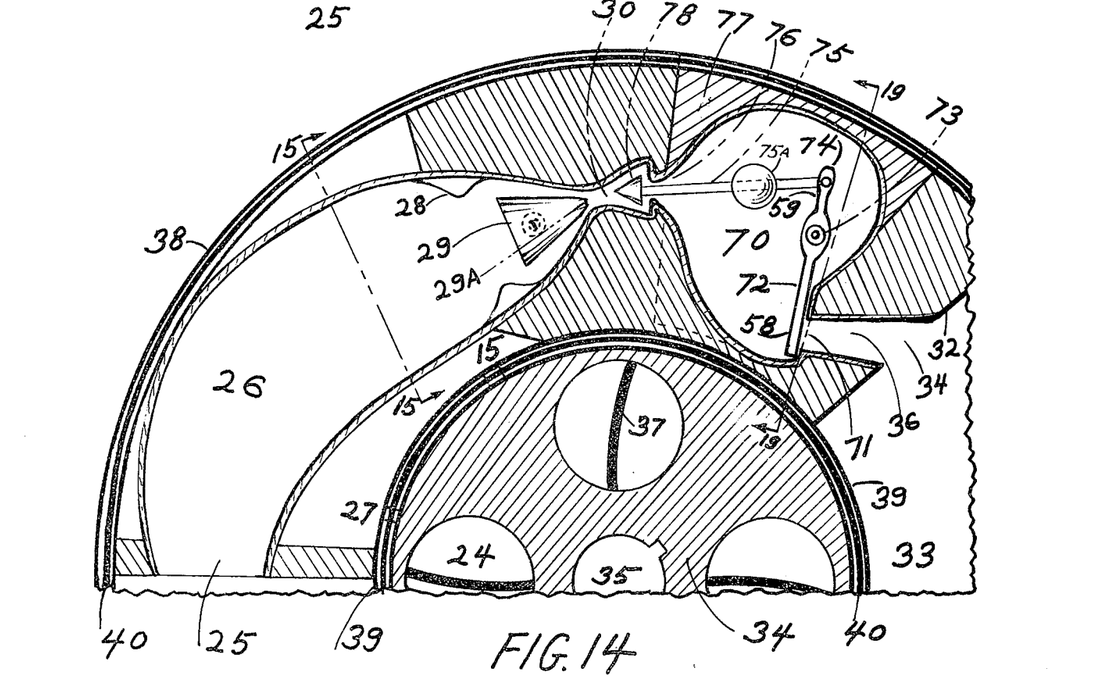
FIG. 14 is a detailed cross sectional view of the long arcuate piston showing the shape and location of the high pressure compressing chamber, the combustor, and the bladed air intake ports.

The high pressure compressing chamber (70), located inside each of the pistons, is shown in FIGS. 14 and 19 (cross section). FIG. 14 shows the interior of said chamber as it would appear when seen from the radial side of the rotor with the obstructing walls removed. 72 is the inlet plate as seen with its longer edge facing the viewer. 75 is the longitudinal view of the outlet rod with its spherical stabilizer, and 78 is the outlet cone.

The high pressure compressing chamber is shaped to accommodate the inlet plate (72) which must have a space to swing in an upstream and a downstream directions, outlet rod (705) and its cone (78), which must also have space to move upstream and downstream, and a removable cap or wall (77) on its peripheral side. This means that the internal shape of the said chamber is asymmetrical, except its two radial or side walls (FIG. 19) which are straight and flat.

FIG. 19 shows the said chamber as it would appear when seen unobstructed from the forward side of the piston.

The said chamber has an inlet port (71) and an outlet port (76), shown in FIG. 14. It has a detachable upper or peripheral wall (77), which is fastened to other walls of the chamber by bolts and other means, and is made leak-proof in respect to gases. This wall could be exchanged with walls of greater thickness for the purpose of decreasing the chamber's usable space and increasing the compression ratio, or with walls of lesser thickness to produce the opposite result.

The said chamber contains a shaft (73), shown in FIGS. 18 and 19, that is placed close to the inner side of the wall that is closest to the forward side of the piston, and positioned parallel to the surface of the said wall as well as to the axis of the rotor, and that has its ends rotatably held in cylindrical niches (79 and 79a) made in the adjoining straightsided walls at a level about one-third of the way down the latters' upper edges (the sides closest to the rotor's periphery).

The said chamber has a rectangular plate (72), shown in FIG. 18 (side) and FIG. 19. (cross section). It has a round hole (61) bored completely through its side in a straight line parallel to the planes of its surfaces and running right angle to its long sides at a point about one-third of the way down from the plate's end that will become the upper side or closest to the peripheral side of the piston when assembled. The part of the plate through which the hole is bored is made very thick (61a). The section of the plate above the said hole is designated as the short side (59), and the part below the said hole is the long side (58). The plate, supported by the aforesaid shaft (73) which runs through said opening (61), could be pushed to swing in an upstream or a downstream direction.

The hinged tip (74), shown in FIGS. 18 and 19, or the plate (72) is connected to one end of the outlet rod (75). The other end of the said rod is attached securely to an outlet cone (78) that is located outside of the outlet port (76), shown in FIG. 14.

Lubrication is accomplished through oil duct (73a) in shaft (73), and oil duct (60) which starts at 73a and ends at 74 (FIGS. 18 and 19).

HOW THE MECHANISM WORKS IN THE HIGH PRESSURE COMPRESSING CHAMBER

In FIG. 14, it is seen that the plate (72) is pivoted at its falcrum and shaft (73). FIG. 18 shows that section 58 is longer than section 59. It means that when a comparatively light push is exerted at the lower end (58) of the plate, the hinged tip (74), through its rod (75) could exert a strong pull on the cone 78 to close the outlet 76 (FIG. 14). This will permit the gases coming into the chamber through inlet 71 to be packed into a comparatively small space without escaping.

When there is no compression or flow of gases, the permanent magnets at 57 and 57a cause the plate to cover the inlet port (71), thus preventing any residual gas in the low compressing chamber (33) to escape through opening 34.

The spherical ball (75a), through which rod (75) passes, exerts a steadying effect on the said rod during acceleration of the rotor.

As a piston head (32) advances towards a closed gate (21) in the low compressing chamber (33), the gases found in its path are pushed into an ever narrowing space between it and the gate, and are at the same time pushed or forced into the high compressing chamber (70) inside the long piston, via a passageway (36) in the piston's forward wall. The current of gases that is forced into the channel (36) by the piston head and gate pushes the surface (58) of the plate (72) towards downstream, and as a result the inlet port (71) opens wide. The downstream movement of the lower side (58) of the plate (72) causes the upper side (59) of the plate to swing upstream. This upstream movement of the tip (74) pulls rod (75) and cone (78) in the same upstream direction, and outlet port (76) becomes closed. The pressure and compression in the said chamber increase as the piston head approaches closer to the closed gate (21) in the low compressing chamber (33). At the height of compression, the gate (21) opens, and pressure falls in the low compressing chamber (33) and the passageway (36). This sudden drop of pressure in the low compressing chamber (33) and the passageway (36) causes the pressure that has been built up inside the high pressure compressing chamber (70) to force the plate to swing towards the inlet port (71) and close the passageway (36). This upstream movement of the longer side (58) of the plate causes the tip (74) of the shorter side of the plate to move toward downstream, and thereby pushes the rod (75) and the cone (78) in the same downstream direction to open the outlet (76). This permits the gases to flow into the combustor, which will be described next.

THE COMBUSTOR

FIG. 14 shows the location, the general shape, and the relative size of the combustor (26) in each of the long pistons. FIG. 15 shows the combustor as it would appear when seen in the direction of the high pressure compressing chamber.

Each combustor has an outer shape resembling that of a familiar tropical fruit of the genus Musa, and is more or less arcuate as that fruit. It has a conical diffuser (29) secured to it with fin-like attachments.

Referring to FIG. 14, 30 is the main entrance to the combustor; 29a is the opening in the diffuser that permits the entrance of the gases needed for ignition in the diffuser; 28 is the constricted section of the combustor; 25 is the opening through which the exhausts pass. It is the location of the combustor's tail end. Holes for ventilation (27) are made in the piston's wall below each combustor. There are also large ports in each piston's wall below each combustor for passage of air from the rotor's central air space (42), shown in FIG. 12. Outlet 15 in said figure appears as 15 in FIG. 14.

The combustors and the compressing chambers are firmly held, but removable, in the solid parts (shown as hatched areas in FIG. 14) of the otherwise hollow pistons.

HOW THE COMBUSTOR WORKS

Figure 7:
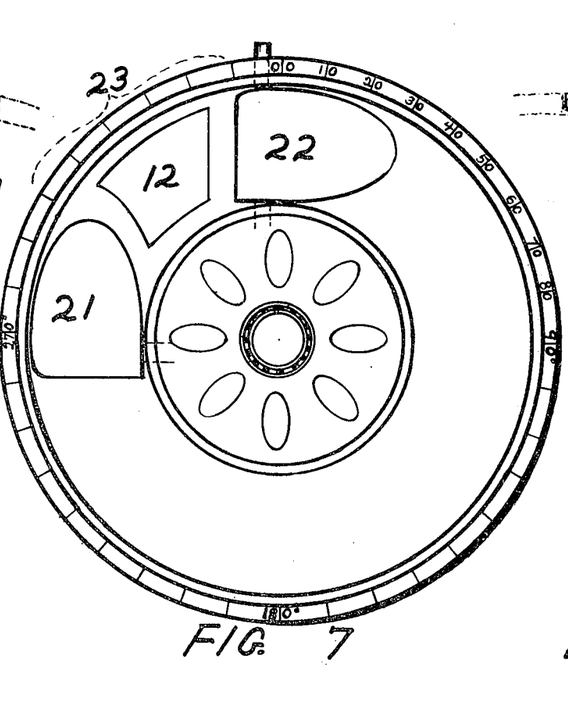
FIG. 7 shows the location of the first and the second gates, the exhaust zone and outlet, and the degree markings.

The compressed gases enter through opening 30 of the combustor (FIG. 14). Part of the gases enter through opening in the vertex 929a) of the diffuser (29) to be ignited by a sparking device, shown in FIGS. 16 and 17. The gases flowing into the combustor are made to converge infront the open side of the conic diffuser by the constricted collar-like section (28), and are ignited by the red hot blast from within the conic body. The resulting expanding gases force their way through exhaust opening (25), and empty into the exhaust zone (23) between gates 21 and 22 (FIG. 7). As a result, the rotor, which contains the combustor, turns by reaction.

AUTOMATIC IGNITION SYSTEM

Figure 28:
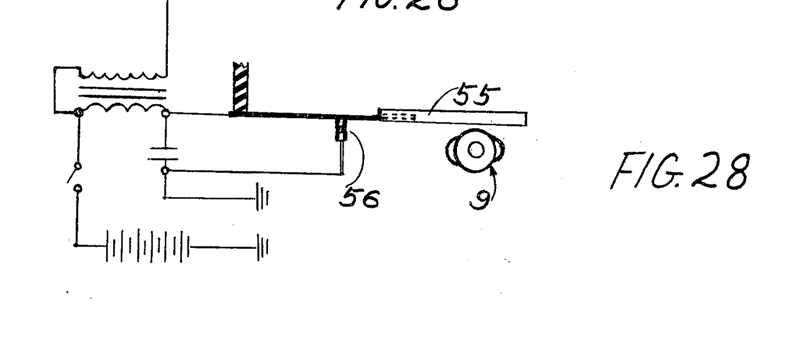
FIG. 28 shows the wiring of the circuit breaker.

The primary circuit breaker of the engine's ignition system is put into motion by a cam-like protruding end of each gate shaft (9 and 9a). The cam-like part operates a springy vibrating breaker arm (55) that controls the breaker point (56). This is shown as a diagram in FIG. 28.

In FIG. 17, a disc (50) is shown with a collection of hair-like conducting wires and flexible conductors (49) sticking out of its surface. The front and back square walls of the casing (FIG. 1) adjoining the rotors and provided with a plurality of evenly spaced threaded holes (3) for the said disk. The parts of the hair-like and flexible conductors protruding from the surface of the said disk and the disk itself are connected to a well insulated high energy secondary wire (51) that comes from a conventional source. The said disk has an insulated threaded case (45) which, in turn, is held in a threaded body (43), which can be screwed into any of the many threaded openings especially made for the purpose in the casing, and when so attached to the casing its hair-like and other conductors protrude into the empty space between the stationary wall of the casing and the side of the moving rotor, but not far out enough to touch any part of the rotor's wall except the protruding convex conductor (44). In the preferred embodiment, the said disk is provisionally placed in one of the threaded openings that corresponds to the 340 th degree marking of the stationary central cylindrical wall. Since many threaded openings are provided in the said casing and are easily reached from the exterior of the casing, the location of the disk can be freely changed to meet any requirement.

In FIG. 16 is shown a conductor (44) with a convex surface, which when assembled will protrude out slightly from the wall of each rotor, more specifically, that part of the rotor occupied by the piston and its combustor, but not far out enough to touch the wall of the casing at any point, except the hair-like and flexible conductors (49) protruding out of the disk (50) in the casing. This second conductor (44) is securely held in a non-conductor (45a) located in the wall of the rotor. A well insulated wire (47) connects this second conductor to the central electrode of the spark plug (48). Since there are two rotors with their combustors, there are two sets of the ignition means. The number of spark plugs is not limited.

HOW THE IGNITION DEVICE WORKS

The cam-like ends of the shafts (9 and 9a) operate the vibrating breaker arm and breaker point in the primary circuit. Ignition occurs everytime the convex conductor (44) touches the hair-like and flexible conductors (49) protruding from the inner surface of the casing. Since there are two pistons and their combustors, and the section of one piston that holds the convex conductor (44) is separated from the corresponding part of the second piston by 180 degrees as measured by the markings on the central cylindrical wall, the ignition occurs twice every complete revolution of the engine.

The time of the ignition can be easily changed or adjusted by moving the said disk (50) into any of the many other threaded openings (3) specially provided for the purpose in the said casing.

EXHAUSTS

Since the exhaust end (25) of each combustor and the location of the aforesaid convex conductor (44) are separated by about 70° of the rotor's arc, when the convex conductor (44) contacts the flexible conductor of the disk (50) located at 340th degree as determined by the markings on the central cylindrical wall, the exhaust end of each combustor will be well inside the exhaust zone (23) located between the first (21) and the second (22) gates, FIG. 7. With the first gate closed automatically and the second gate blocked by the end of the passing piston, the exhausts from each combustor escape through opening (12) in the central cylindrical wall and ports marked 12a. When gate at 21 opens, the residual exhaust in zone 23 cannot enter the high pressure compressing chamber (70) during the latter's transit since the low pressure at the gate automatically closes the inlet port (71) of the chamber.

LUBRICATION OF THE ROTORS (FIGS. 18 and 19)

An oil reservoir (62) occupies a space in each of the long arcuate pistons. It has inlet (52) and outlet (52a), and many dripping ducts that lead to parts requiring lubrication. It does not extend to the combustor area since the combustor requires circulating air around it, but it partially surrounds the high pressure compressing chamber. The ends of the shaft (73) that holds the plate (72) are oiled by a duct. A passageway (73a) that communicates with the interior of the said oil reservoir (62) runs through the center of the shaft (73) that supports the plate (72). At the midpoint of the said shaft, the oil passageway (73a) branches into a duct (60), which is made between the surfaces of the plate (72), and reaches and lubricates the hinge (74). Small outlets in the walls of the reservoir also help to lubricate the said grooves in the radial sides of the central cylindrical wall.

Lubrication is done by gravity and centrifugal reaction with the help of outlets and ducts that lead to moving parts. In rotating the body, the "upward" becomes "downward", and vice versa, and oil will flow if there is an outlet.

AN ALTERNATE HIGH PRESSURE COMPRESSING CHAMBER

Figures 24, 25:
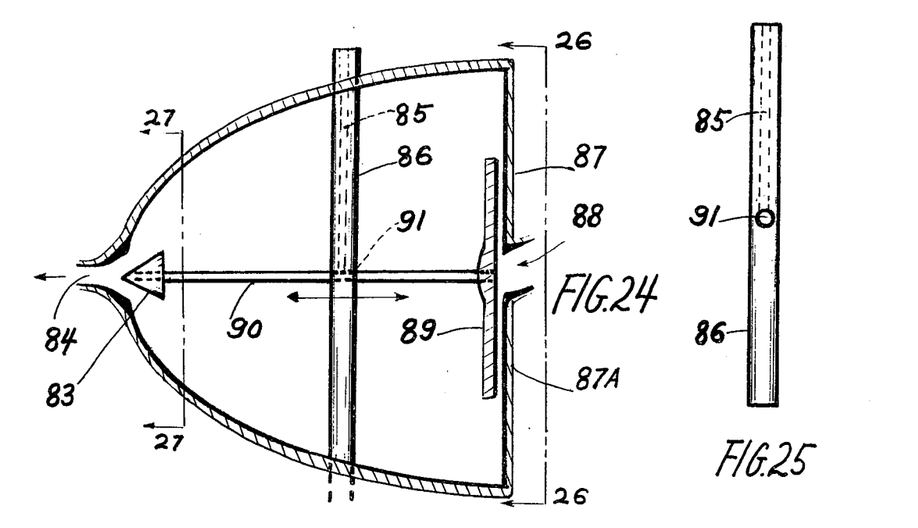
FIGS. 24 to 27 are various views of the alternate high pressure compressing chamber.
Figures 26, 27:
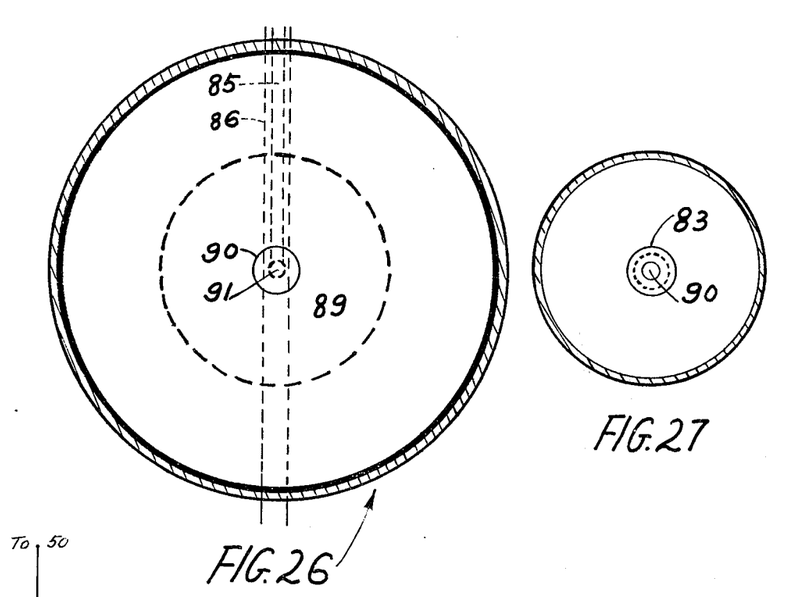

An alternate high pressure compressing chamber (FIG. 24) is made in the shape that resembles a half of a prolate ellipsoid produced by dividing the ellipsoid along its minor diameter. Its circular side, when assembled, faces toward the piston head, and has an inlet port (88) that communicates with the primary compressing chamber (33). It has a circular plate (89) that covers and uncovers the said inlet port. It has in its vertex an outlet port (84) which can be closed or opened by a conic body (83). In the chamber's midsection, and positioned perpendicular to the rotor's axis, is a shaft (86), shown in FIGS. 24 and 25, whose ends are held in the chamber's walls, and that has an oil duct (85) running down its center, and a hole (91) bored through its midsection. A second rod (90), positioned perpendicular to the first and having threaded ends goes through the hole (91), and has its one end screwed into the said circular plate (89) and the other end into the base of a conic body (83), whose vertex points toward the outlet port (84).

Gases entering the said chamber will push the circular plate in a downstream direction, and thereby closes the outlet port to build up pressure inside the said chamber. When pressure in and at the inlet port falls as a result of a gate opening in the primary compressing chamber (33), the pressure built up inside the high pressure compressing chamber will push the circular plate in an upstream direction, and causes the rod and the conic body to be pulled in the same direction to open outlet 84. Magnets (87 and 87a) prevent premature opening or closing of the outlets.

The said chamber replaces the regular chamber in large engines.

ASSEMBLING THE PARTS

The assembling of the engine is very simple. The power output shaft (16) is inserted in the central opening (16a) of the central cylindrical wall (FIG. 3). The gates (21 and 22) with their shafts (9 and 9a) through them, are positioned in the para-elliptic openings (10 and 10a) in the peripheral section of the said cylindrical wall. The ends of each gate's shaft are rotatably held in the engine's casing and the said cylindrical wall. Each column (11, 11a) is securely positioned in each of the said para-elliptic openings.

The rotors are then placed close to, one on each side of, the said cylindrical wall with their radial sides positioned parallel to those of the said wall, and with the power output shaft (16) inserted through their hubs. The free inner (39 and outer (38) rims of each rotor are inserted into the grooves (17 and 19) in each side of the said cylindrical wall, and pushed towards the said wall without making the contact too tight. Then, one of the rotors is rotated until its forward wall or piston head (32) is exactly 180° apart from the corresponding part of the other rotor. This is determined by the degree markings on the said cylindrical wall (FIG. 7). When so aligned, the two rotors are securely attached to the said power output shaft by means of keys and other devices to avoid slipping and sliding.

The rectangular side walls of the casing are bolted to the central cylindrical wall. The square front and rear walls (FIG. 1) of the casing and the rectangular side walls (FIG. 2) are joined together by conventional means. The ends of the power output shaft are made to penetrate, and to be supported in the bearings of, the square front and rear walls.

The position of the disk that holds the flexible conductors (49) is adjusted by moving it towards or away from the first gate, or if necessary from the second gate, so that the distance between it and a gate is sufficient to allow each combustor to expel its exhausts while its tail end (25) is still inside the exhaust zone (23) between the first (21) and the second (22) gates, (FIG. 7). This is easily done since the said disk (50) and its conductors (49) are accessible from the outside of the casing without any trouble, and the many threaded openings (3), shown in FIG. 1, are easily reached from the outside of the casing. The unused openings serve as the ventilation holes.

HOW THE VARIOUS PARTS IN THEIR ASSEMBLED COMBINATION FUNCTIONS AS AN ENGINE

I have already described in detail under various headings of this specification as to how the parts of this engine function. At this point I shall give a unified picture as to how the various parts function as an assembled whole. Where description of the individual parts and their locations require repetition for a better understanding of the whole, it shall be made as briefly as possible.

The preferred embodiment has two rotors, each rotor positioned on each radial side of the stationary central cylindrical wall. Each rotor has in its peripheral section a primary compressing chamber, and a long arcuate piston section. The stationary central cylindrical wall has two gates that pivot on the shafts held in the said wall's para-elliptic openings. Both gates swing, periodically and alternately, into the primary compressing chambers, which are actually low pressure chambers.

The fuel and air starting from an external source of supply enter through inlet port and passageway (13), shown in FIG. 3. A cross section of the said inlet port and passageway (FIG. 4) shows the said passageway bifurcating into the left outlet that communicates with the left primary compressing chamber in the peripheral section of the left rotor, and into the right outlet that communicates with the right primary compressing chamber of the right rotor.

The duct (24) in columns identified as 11 and 11a in FIG. 3, and in the cross section of the said column (FIG. 8) are used only for passage of gaseous additives when the engine is using fuels other than gasoline.

Since the forward side (32) of each piston is positioned diametrically opposite of the corresponding side of the other piston, and each piston subtends about 140° of the rotor's arc, there is a space of about 40° between the tail end of one piston and the head wall of the second piston, and vice versa. The length of the said space is constant due to the face that the two rotros are keyed and bolted to a common power output shaft and must rotate in unison.

Each gate takes a space slightly less than the distance between the tail end of one piston and the head side of the second piston, or a space of about 40° of the rotor's arc to swing into or out of the left or the right primary compressing chamber. This means that each gate can swing into the left or the right compressing chamber during the moments the 40° interval between the tail end of one piston and the head wall of the second piston is passing by it.

Figure 23:
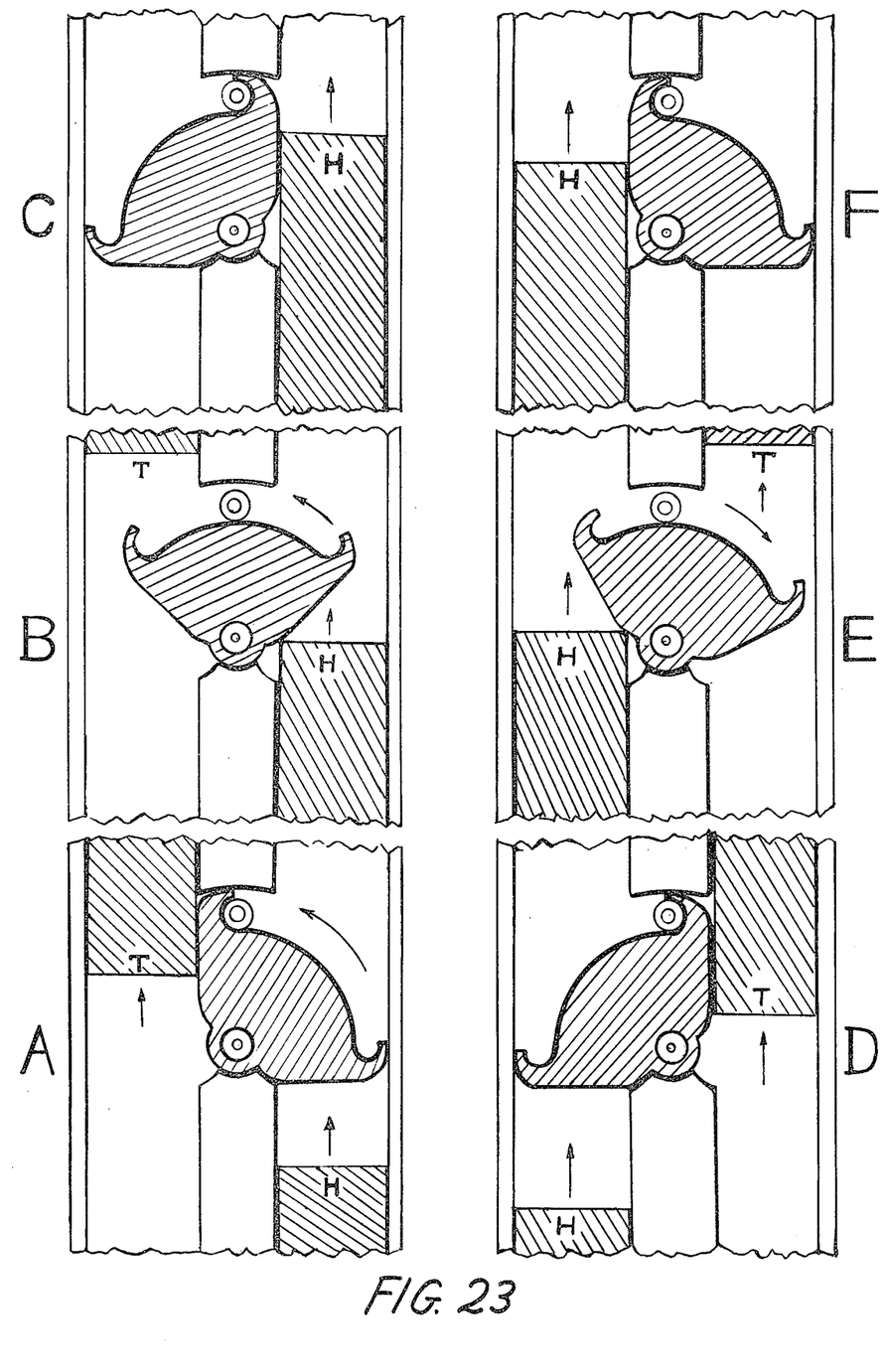
FIG. 23 illustrates schematically the various positions of the gate.

FIG. 23 is a schematic picture of the first gate (21) and the two pistons as viewed from the top or peripheral side of the central cylindrical wall. When pushed in the absence of a rotor, the gate turns on its shaft either to the right or to the left, but stops when either one of its concaved sections (65 or 65a) touches the side of the column (11).

At A in FIG. 23, the gate is blocking the path of the advancing right piston head (H), which is compressing the gases in its path against the closed gate, while the tail end (T) of the left piston is retreating in the direction of arrow. But the tail end of the left piston, by its presence in the gate area, is still preventing the gate to turn to the left, and the gate remains firmly closed or locked in the path of the right piston.

At B in FIG. 23, the tail end (T) of the left piston has retreated sufficiently in the direction of the arrow and is no longer blocking the gate from turning to the left, and the head (H) of the right piston is able to pass through the right side by pushing the gate toward the left. In doing so, as shown in C, the right piston causes the gate to close the left path or chamber so that the head of the left piston could compress gases against the closed gate.

At D in FIG. 23, the tail end of the left piston has disappeared on the other side. Since the piston is long, its head side (H) is now seen coming up toward the closed gate at the left, and the equally long body of the right piston has not passed the gate area, and is still preventing the gate to swing to the right, and thereby helping the left piston head to compress gases against a firmly closed gate.

At E in FIG. 23, the left piston head is able to push open the gate because the tail end of the right piston has cleared away from the gate area. The gate is pushed to the right at F.

It is obvious that the gate could swing open only during the moments the interval between the tail end of one piston and head side of the second piston is passing a gate area. In other words, the gate could swing open when the tail end of one piston clears away from a gate area at the same time and rate as the head side of a second piston enters the same gate area. Since the diametrically opposite pistons are keyed to the same power output shaft, they will turn at the same time and rate and in the same direction, and the gate will open or close at the right time without direct human or electronic help.

The two gates open and close in the same manner, but only the first gate (21 in FIG. 7), whose shaft is located at 265th degree (as indicated by the degree marking on the central cylindrical wall) helps in the compressing of gasses, while the second gate located about 90° beyond or at 255th degree helps to contain the exhausts in the exhaust zone (23 in FIG. 7).

The gases that have entered the primary compressing chambers via the passageway identified as 13 in FIGS. 3 and 4, are compressed and pushed by the pistons against closed gates in the said chambers, and forced into the high pressure compressing chamber (70) located in each piston's interior.

The inlet port (71) of the high pressure compressing chamber opens when the force of the incoming gases pushes the plate (72) in a downstream direction. This same force will make the rod (75) and the cone (78) to move in an upstream direction to close the outlet port (76). Compression is accomplished in the high pressure compressing chamber by packing the gases into a comparatively small space.

When the piston reaches the gate and the latter opens, the pressure in the primary compressing chamber and the inlet passageway (36) suddenly drops, the and already built up in the high pressure compressing chamber pushes the plate (72) against the opening (71) and closes it, and at the same time causes the rod (75) and the cond (78) to move in a downstream direction to open the outlet that leads into the combustor.

A part of the gases from the said chamber enters the opening in the vertex of the cone shaped diffuser of each combustor to be ignited by an automatic ignition device, and the rest of the gases enter the combustor proper through the space surrounding the cone, and converge infront the open side of the cone in time to be ignited by the full blast of ignited gases coming out of the cone. The resulting expanding gases strike the back side of the first gate, and the rotor turns by reaction. Thus, the kinetic energy of the expanding gases is converted directly into usable rotary motion.

The ignition occurs when a convex (44) protruding out of each piston's wall touches the flexible conductors extending out of a disc held in the casing. Since the exhausts must be expelled from the combustor while its tail end is still inside the exhaust zone (23), the said convex conductor and the said flexible conductors are sufficiently separated from each other to insure the electric contact at the proper time.

The compression ratio in the high compressing chamber can be changed by changing the cover (77) with that of different thickness, and the timing of the ignition could be changed or adjusted by moving the conducting projections and their disc into any of the threaded openings located in the clockwise or counterclockwise direction of their original position. FIG. 1 shows the location of the threaded openings (3). Although the invention has been described hereinabove with reference to the preferred embodiment, various modification can be made without departing from the scope and spirit of this invention. It is my intention to cover in the appended claims all modifications of this invention that are within the scope and spirit of this invention.

Having thus described my invention in the above specification, and having illustrated the same in the accompanying drawings, I hereby claim for the purpose of securing letters patent therefor, the following:

1. A coaxial rotary engine which is designed to receive air and other gases from suitable sources of supply, to compress and ignite such gases, and to convert the kinetic energy of the expanding gases into usable rotary motion, said engine comprising, in unique and useful combination,
   a. a stationary central cylindrical wall, positioned substantially in the engine's midsection, having a peripheral part that has a plurality of para-elliptic openings with pivots rotatably held therein, radial sides with paired grooves, and a central section that has a hub-like center with roller bearings for the support of
   b. a central power output shaft;
   c. a plurality of coaxial rotors, placed close to the said central cylindrical wall with their radial sides positioned parallel to those of the said wall, each rotor having in its peripheral section a long, arcuate piston, and a fuel and air receiving primary compressing chamber, and in its central section a plurailty of openings containing fan-like blades for the intake of air, and a hub-like part that holds the power output shaft;
   d. a plurality of gates, which are supported by the said pivots in the para-elliptic openings of the said central cylindrical wall, and which are designed to swing into the said primary compressing chambers to serve like doors against which the said pistons could compress gases, and to swing out of the paths of said pistons when the primary compression is accomplished;
   e. a high pressure compressing chamber, which is located inside each of the said pistons, and which receives gases that were initially compressed in the said primary compressing chamber;
   f. a compact combustor, which is located inside each of the said pistons, and which receives compressed gases directly from the said high pressure compressing chamber, and whose content is ignited at regular intervals by
   g. an automatic ignition device;
   h. oil reservoirs located in said central cylindrical wall and said long, arcuate pistons; and
   i. a cuboidal casing having square, comparatively thick, front and rear walls, which are provided with openings for ventilation, and circular central holes with ball bearings for the support of the two end sections of the said power output shaft, and also having substantially rectangular, but less thick, detachable side walls whose surfaces touch tangentially the peripheral side of the said central cylindrical wall and securely hold the latter by means of bolts.

2. The invention of the coaxial rotary engine as claimed in claim 1, the said stationary, central cylindrical wall having
   a. a hub-like center with ball bearings for the support of the central power output shaft, and elliptic holes for air passage bored around, but not too close to, the said hub-like center;
   b. easily discernible degree markings, from 0 to 359, etched in its peripheral side, the 0 degree starting at a point that is normally at the top when the engine is on a level surface, and the number of degrees increasing clockwise, which being the direction of the rotation of the assembled rotors;
   c. two grooves, an outer and an inner, made in the flat surface of each of its radial sides, the outer groove running close to its peripheral border and making a complete circle, and the inner one following a line that is approximately between the said periperal border and its hub, and also making a complete circle;
   d. two openings, about 90° apart, made through its radial sides and located between the said outer and the inner grooves but not touching them, each opening having the shape of a para-ellipse, a shape that resembles the graph of $y = \sec x$, or one that is produced by cutting an ellipse along its minor axis, and attaching to the cut side of the retained semi-ellipse the long side of a rectangle of the same length as the said minor axis;
   e. a pair of pivots for said gates to swing on, each pivot placed inside each of the said para-elliptic openings, near and parallel to the openings's straight side that corresponds to the minor axis, and rotatably held by the said wall and casing;
   f. a pair of columns, positioned parallel to the radial side of the cylindrical wall as well as to the said pivots, each column extending from the casing and passing across each of the said para-elliptic openings at a point close to the narrow side of, but inside, the said opening, and terminating in the said wall, and having a passageway running down its center with lateral outlets that communicate with the said primary compressing chambers;
   g. an oil reservoir in that section of the wall not occupied by the para-elliptic and other openings, said reservoir having inlets and outlets, and a plurality of small ducts that open into the various sections of the said outer and inner grooves;
   h. a hollow space and outlets for exhausts located between the said para-elliptic openings, and the inner and outer grooves, but not touching any of them; and
   i. a fuel-and-air inlet port and a channel that bifurcates and communicates with the primary compressing chambers.

3. The coaxial rotary engine as claimed in claim 1, wherein the said rotors are used in pairs in the engine's compressing system, and are positioned one on each side of the said central cylindrical wall with their radial sides parallel to those of the said wall, and their centers keyed and fastened to a common power output shaft so that the two could rotate in unison, each of the said rotors comprising, in unique and purposeful combination,
   a. a round, central section having a circular hole and keys in its center to hold securely a section of the power output shaft that protrudes from the corresponding part of the said central cylindrical wall, and also a plurality of round holes for ventilation bored around, but not too close to, the said central circular hole, each ventilating hole having a curved blade securely fastened across, but well inside, its opening to permit it to function like a fan blade whenever the rotor is in motion; said section being securely held by means of bolts in the circular space, resembling the hollow of a traditional doughnut, of
   b. an outer or peripheral section constructed in the general shape of half of an anchor ring, i.e., an anchor ring cut completely around along its equator into two equal parts, and whose cross section at any point of its 360 degree arc having a general appearance of a semi-ellipse that was produced by cutting an ellipse along its minor axis, the open or missing side of the section, corresponding to the minor axis, facing the radial side of the said central cylindrical wall when assembled; the said open side having c. outer and inner concentric rims which have been slightly extended and made thicker than the wall of which they are extensions and which retain seals in their extremities, the said outer and inner rims made to fit into the aforesaid outer and inner grooves, respectively, located in each of the radial sides of the said central cylindrical wall, which in its assembled position serves as a sealing wall for the said peripheral section's open side;

d. a primary compressing chamber, which is located in, and occupying a space that subtends about 220° of the arc of, the said peripheral section, and whose function is to provide a space where the initial compression of gasses can take place;

e. a long piston section, which is mostly hollow and which occupies the remaining space or about 140° of the said peripheral section, and whose forward wall (the side that must face in the direction of the rotor's rotation) serving as the piston head, the said forward wall having in its midsection an opening through which the partly compressed gasses of the said primary compressing chamber are forced into f. the high pressure compressing chamber, where the gasses are further compressed by being packed into a comparatively small space, and then released into a compact g. combustor, which occupies a space further inside said piston section, and which has an exhaust outlet port in the rear wall of the said section;

f. an oil reservoir, located in the forward part of said section.

4. The invention of a coaxial rotary engine as claimed in claim 1, the said high pressure compressing chamber, located inside each of the pistons, having a. an inlet port through which gasses from the said primary compressing chamber enter b. a compact chamber defined by asymmetrical walls, except on the radial sides where the walls are straight and flat;

c. a shaft placed near the inner side of the chamber's wall closest to the piston head, and positioned parallel to the surface of the said wall as well as to the rotor's axis, and having its ends securely placed, but removable, in cylindrical depressions made in the said straight, flat walls;

d. a thick rectangular plate, made in one piece, and demarked into a short upper third side and a long lower side by a round hole bored through its side in a straight line parallel to the plane of its surface, and having the shaft described hereinabove in said hole, and said plate designed to swing downstream on said shaft to open the said inlet port whenever its long lower side is pushed in a downstream direction by the gasses coming in through said inlet port which it periodically covers, or swing in an upstream direction and close said inlet port when pressure built up inside said chamber becomes greater than the pressure outside said inlet port;

e. an outlet port through which the said chamber communicates with a passageway that leads into the said combustor;

f. a rod having its one end attached by means of a hinge to the upper end of the said plate, and which will be pulled in an upstream direction whenever the longer, lower side of the plate is pushed in a downstream direction by gasses coming in through said inlet port, or pushed in a downstream direction whenever the gasses stop coming in and the pressure built up in said chamber causes said long lower side to swing in an upstream direction and closes the said inlet port, the said rod having its other end embedded and securely held in the base of g. a solid cone which is located, when assembled, on the outer side of the said chamber's outlet port with its base facing the said port, and which can close the said outlet port when pulled by the rod and the plate in an upstream direction or against said port, or open the said outlet port when pushed in a downstream direction and away from said port by the said rod and plate;

the said plate, rod, and cone, being thus interconnected and coordinated, when the said inlet port is opened by the pressure of the incoming gasses, when the said inlet port is opened by the pressure of the incoming gasses, the said outlet port closes almost instantly to permit gasses to be packed into, and to be compressed, inside said chamber, and when the pressure changes, the outlet port opens to permit gasses to flow into the combustor.

5. The invention of a coaxial rotary engine as claimed in claim 1, wherein each rotor has in its interior a combustor, and each combustor comprising, in a useful combination, a. an arcuate hollow body having a generally circular cross section;

b. a conical diffuser that has an inlet port in its vertex that points upstream when assembled, evenly spaced fin-like projections which radiate from its sides and which are attached to the inner surface of the combustor's forward side, and ignition means in the form of a sparking device;

c. a constricted section in the inner side of the combustor proper and located just infront the open side of the conic diffuser, said section designed to cause the gases coming into the combustor through the spaces surrounding the conic diffuser to converge in front of the open side of said diffuser so that they could be ignited more efficiently by the comparatively large amount of flame rushing out of said cone;

d. a tail end that merges with the terminal wall of the piston and having an opening for exhausts through said wall;

e. a cooling space belonging to, and surrounding the exterior of, the combustor, the said space receiving fresh air from plurality of ventilating holes in the walls of the piston, and passageway from the rotor's central section where cooling air is made to swirl.

6. The invention of a coaxial rotary engine as claimed in claim 1, wherein the said automatic ignition device comprising, in a useful combination, a. a spark plug, the central electrode of which is connected to b. an insulated wire that goes through c. a disklike nonconductor that is attached to the wall of each rotor, and said wire connected to d. a convex conductor that protrudes from said disklike non-conductor into the space between the wall of each rotor and the casing, but not so far out as to touch the casing;

e. a second insulated disk held in one of the threaded openings in the inner surface of the engine's casing, and having in its central section f. a conducting body that is connected to a well insulated g. high energy secondary wire that traces its origin to a conventional source outside the casing, said conducting body having on and in its circular surface h. a tuft of hairlike and flexible conductors which protrude into the space between the casing and each rotor, but not so far out as to touch the rotors, except the convex conductor protruding from the wall of each rotor;

i. primary circuit breaker in the form of a breaker arm operated by a cam-like protruding end of each shaft of said gates; said ignition device producing an electric spark everytime the said two protruding conductors touch each other in the course of the rotors' rotation, and the disk in the said casing provided with additional j. treaded openings in said casing so that said second insulated disc could be screwed into one of the other openings closer, or further away from, a gate, and thus having the means to change the timing of the ignition.

7. The invention of a coaxial rotary engine as defined in claim 1, wherein the said gates are installed in pairs: the first gate used by the pistons to compress gasses against, and the second gate used to confine exhausts in the space between it and the first gate just before their expulsion through a port, and both designed to fit into and pivot in the said para-elliptic openings in the said central cylindrical wall and to swing alternately into or out of the said primary compressing chambers, each of the said gates having a. a body whose overall shape is that of a fourth part of a flattened oblate ellipsoid by cutting an ellipsoid into symmetrical parts without shortening its minor axis, and whose general plan view is that of a quadrant with its right angled corner replaced by a small arc of 180° and indentations, and with a large section of its rim removed except at the two side walls that correspond to its radii, and whose side view or outline as seen by one facing either of its flat sides resembling that of a graph of $y = \sec x$, or para-elliptic;

b. a round hole for its shaft bored near, but not too close, to the said small arc, and extending perpendicularly to the radii or straight sides of the said body;

c. a fan-shaped reservoir for oil, equipped with inlet and outlets, located between the two flat sides, which correspond to the gate's radii, and bounded on the third side by an arched wall, the latter located closer to the gate's rim than to the hole for the shaft;

d. a concave niche or recess located in the inner side of each of the said two sides or walls just above the said arched wall, the said niches, by their contacts with the convex sides of the said column located in each of the said para-elliptic openings, helping to prevent each gate from turning too far to either side; and e. conventional seals in the gate's curved surfaces.

8. The invention of a coaxial rotary engine as defined in claim 1, in which gasses are compressed inside each piston in a high pressure compressing chamber that has an inside shape of half of a prolate ellipsoid produced by dividing an ellipsoid along its minor diameter, and that is assembled with its circular flat side facing upstream toward the said piston head and its vertex pointing downstream toward the said combustor, the said high pressure compressing chamber having a. an inlet port in its circular flat side communicating with the said primary compressing chamber;

b. an outlet port in its vertex communicating with a combustor located further inside the piston;

c. a first rod positioned perpendicularly to the axis of the rotor and its ends securely held in the walls of the midsection of the said chamber, and having an oil passageway running down its center and a round hole bored through its midsection in an upstream-downstream direction;

d. a second rod, positioned perpendicular to the first, and supported in the said round hole of the first rod, and having its ends threaded;

e. a circular plate, located close to the circular wall of the chamber, and covering the said inlet port, and having a threaded center that holds securely one end of the said second rod;

f. a cone-shaped body, located near the said outlet port in the chamber's vertex, whose base has a threaded center that holds securely the threaded end of the second rod, and whose vertex is aimed at the said outlet port;

the said circular plate, the second rod, and the conic body designed to move together in a downstream direction to open the inlet port and at the same time close the outlet port when the force of the incoming gases pushes the circular plate in a downstream direction, and the said circular plate, the second rod and the conic body designed to move together in an upstream direction to open the outlet port and close the inlet port when the pressure at the inlet port falls and the pressure built up in the said chamber causes the circular plate to move toward and to touch the said inlet port.

* * * * *